United States Patent [19]

Eves et al.

[11] Patent Number: 5,873,057
[45] Date of Patent: Feb. 16, 1999

[54] INTERACTIVE AUDIO ENTERTAINMENT APPARATUS

[75] Inventors: David A. Eves, Crawley; Richard J. Allen, Redhill, both of England

[73] Assignee: U.S. Philips Corporation, New York, N.Y.

[21] Appl. No.: 795,716

[22] Filed: Feb. 4, 1997

[30] Foreign Application Priority Data

Jul. 2, 1996 [GB] United Kingdom .................. 9602431

[51] Int. Cl.$^6$ .............................. A63F 9/22; G10L 4/02
[52] U.S. Cl. .......................................... 704/201; 345/473
[58] Field of Search ................................. 704/201, 235, 704/251; 434/321, 322; 345/327, 353, 473; 386/84; 463/41, 9

[56] References Cited

U.S. PATENT DOCUMENTS

| | | | |
|---|---|---|---|
| 3,960,380 | 6/1976 | Yokoi | 463/50 |
| 4,305,131 | 12/1981 | Best | 345/327 |
| 4,569,026 | 2/1986 | Best | 345/327 |
| 4,752,836 | 6/1988 | Blanton et al. | 386/84 |
| 4,766,541 | 8/1988 | Bleich et al. | 463/31 |
| 5,161,034 | 11/1992 | Klappert | 386/39 |
| 5,393,073 | 2/1995 | Best | 273/434 |
| 5,539,822 | 7/1996 | Lett | 380/20 |
| 5,550,999 | 8/1996 | Nagano et al. | 395/182.09 X |
| 5,581,706 | 12/1996 | Jessup, Jr. et al. | 395/200.13 X |
| 5,586,937 | 12/1996 | Menashe | 463/41 |
| 5,604,855 | 2/1997 | Crawford | 463/9 X |
| 5,676,551 | 10/1997 | Knight et al. | 434/236 |
| 5,680,533 | 10/1997 | Yamato et al. | 345/473 |
| 5,682,511 | 10/1997 | Sposato et al. | 345/353 |
| 5,692,212 | 11/1997 | Roach | 345/473 X |
| 5,695,401 | 12/1997 | Lowe et al. | 463/4 |

FOREIGN PATENT DOCUMENTS

0016314A1  10/1980  European Pat. Off. .

OTHER PUBLICATIONS

"Flawed Methods for Interactive Storytelling", by C. Crawford, Interactive Entertainment Design, vol. 7, No. 4, Apr. 1994.

"Interactivity, Plot, Free Will, Determinism, Quantum Mechanics and Temporal Irreversibility", by C. Crawford, Interactive Entertainment Design, vol. 8, No. 4, Apr. 1995.

"Simulating and Implementing Agents and Multiple Agent Systems", by M. Graham et al, Proc. European Simulation Multiconference 1991, pp. 226–231.

"The Behaviour Language: User's Guide", by R.A. Brooks, Al Memo 1227, MIT AI Laboratory, Apr. 1990.

"Control vs. Interactivity", by C. Crawford, Interactive Entertainment Design, vol. 7, No. 5, Jun. 1994.

"Personality Modelling", by C. Crawford, Interactive Entertainment Design, vol. 7, No. 6, Jul. 1994.

"Editorial: Revolution and Apocalypse", by C. Crawford, Interactive Entertainment Design, vol. 7, No. 3, Feb. 1994.

"Tools for Teams", by Talin, Interactive Entertainment Design, vol. 7, No. 3, Feb. 1994.

*Primary Examiner*—David R. Hudspeth
*Assistant Examiner*—Scott Richardson
*Attorney, Agent, or Firm*—Steven S. Rubin

[57] ABSTRACT

The speech of a group of virtual characters is modelled using a directed graph or audio web, where each utterance is a node (A1–A7, B1–B5) in the web having links from it to each possible utterance that can be made in reply at any point in the course of the interaction. The choice of the next node (conversation segment) is dependent on attributes of the character and/or the virtual environment in which the conversation is taking place. These attributes may be fixed, modified by system function calls available at each node, or modified in response to user input.

13 Claims, 2 Drawing Sheets

INTERACTIVE AUDIO ENTERTAINMENT APPARATUS

The present invention relates to entertainment systems and in particular to game and narrative systems where one or more computer-modelled characters traverse a virtual environment, interacting with the environment and other characters within the environment, under direct or indirect control of a user.

BACKGROUND OF THE INVENTION

Character-based games or interactive drama have been modelled as a network of inter-connected pre-recorded scenes in a "story-net" arrangement of branching nodes. At each node in the network, a decision is required as to which of three of four possible scenes will be played out next with there being a common direction of travel through the scripted narrative such that the user will eventually reach the, or one of a number of possible, final scenes. Examples of different narrative structures, from the non-interactive "linear" form through the introduction of various effects and game-playing elements to full branching story structures, are described in "Flawed Methods for Interactive Storytelling" by Chris Crawford, Interactive Entertainment Design, Vol 7, No 4, April 1994. The problems of the vast amount of data required to provide even a few alternative paths through a story structure as opposed to the constraints of traditional (linear) narrative techniques are discussed and, whilst a solution is claimed, the details are withheld. These problems of interactivity against storyline are further discussed in an article by the same author "Interactivity, Plot, Free Will, Determinism, Quantum Mechanics and Temporal Irreversibility" Interactive Entertainment Design, Vol 8, No 4, April 1995.

Considering just the audio side of interactive entertainment, the character based games or interactive drama require dialogue between the characters: speech is the easiest way to convey meaning and feeling and thus generate a feeling of immersion for the user by relating to the characters. In traditional systems, such as those described by Crawford, this has been done using long pre-recorded sequences of speech providing the soundtrack to the selected scene following each branch point of the story. Even as a purely audio entertainment, such systems are still tied to the ongoing branch structure which, in addition to having long periods passing without variation, is still prohibitive in the amount of data required to be stored for even relatively few branches.

OBJECTS AND SUMMARY OF THE INVENTION

It is therefore an object of the present invention to provide a character-based audio entertainment system with increased opportunity for variation whilst requiring less audio data to be stored than heretofore conventional.

In accordance with the present invention, there is provided an entertainment apparatus comprising network data and character data stores coupled with a data processor; the network data store holding data defining a network of forward-linked nodes, with at least some nodes having forward links to two or more further nodes, and with the data processor being configured for the sequential selection of linked nodes of the network; and the character data store containing at least one stored attribute value and selection from said links to at least two further nodes being determined by said attribute value; characterised in that the apparatus further comprises an audio data store containing a plurality of data streams defining a respective audio signal segment for each node of the network, the audio data store being coupled with the network data store and processor and controlled to output an audio signal segment data stream on selection of the respective node.

By use of the network of interlinked nodes, each audio segment (speech or sound effects) needs to be stored only once, with the respective node being selected each time that segment is required. The character data store suitably holds a plurality of stored attribute values with the selection from at least two further nodes being determined by the satisfaction of respective different combinations of attribute settings, at least one of which is suitably a default setting chosen in the event that none of the specified combinations is satisfied. This "audio web" may be used to generate conversations between two or more virtual characters, each with the own set of "personality" attributes in the character store, the setting of these attributes defining the path taken by the conversation at each node.

The apparatus may further comprise a function call store holding a plurality of commands each specifying a respective processor function, each function call being associated with at least one node of the network and being called and implemented by the processor on selection of the or each associated node. The processor may be controlled to modify at least one stored attribute value from the character data store in response to at least one function call. By use of these function calls, the characters' conversation path becomes more dependent on their reaction to the conversation and their fellow characters. One or more further nodes may be defined in the network, each with an associated function call but without a respective audio signal segment. These nodes without audio may be used as "stage directions" to alter features of the virtual environment or the characters.

User-operable input means may be provided coupled to the processor, with the user input affecting the selection at one or more of the nodes, suitably by the processor altering the setting of at least one of the stored attribute values. By initially setting or continually changing the attribute values, the user can vary the characters' "mood" and then hear how this affects the path of the conversation and the characters' inter-relationships.

The apparatus may output the audio data to a separate unit, or may include audio signal reproduction apparatus coupled to the audio data store, receiving the output data streams and reproducing the audio signal segments.

The invention also provides a removable storage device, such as a tape or an optical disc, acting as the audio data store and holding the audio signal segment data streams together with the data of the network data store which data includes indexing information (such as track and sector addresses) identifying the respective storage locations of each audio signal segment data stream. With the use of a removable storage device, the apparatus would include suitable access means such as a disc reader. At the start of a session, the network data and accompanying indexing information are downloaded such that the selected audio segments may then be called with their track addresses such as to minimise access delays.

BRIEF DESCRIPTION OF THE DRAWINGS

Further features and advantages of the present invention will become apparent from reading of the following description of preferred embodiments of the invention, for the purposes of example, with reference to the accompanying drawings in which.

DETAILED DESCRIPTION OF THE PREFERRED EMBODIMENT(S)

The following description is of audio web "story telling" apparatus where characters converse with each other whilst interacting in a virtual world. The path taken by the characters' conversation is not scripted but instead traverses a networked collection of nodes, each comprising a short audio segment of spoken word or sound effects. At each node a decision is taken as to which of a number of possible branch paths (leading to respective further nodes) will be taken. The decision is taken on the basis of various conditions applied at each node and on the basis of attributes of the various characters as they stand at that node, as will be described.

Figure 1:
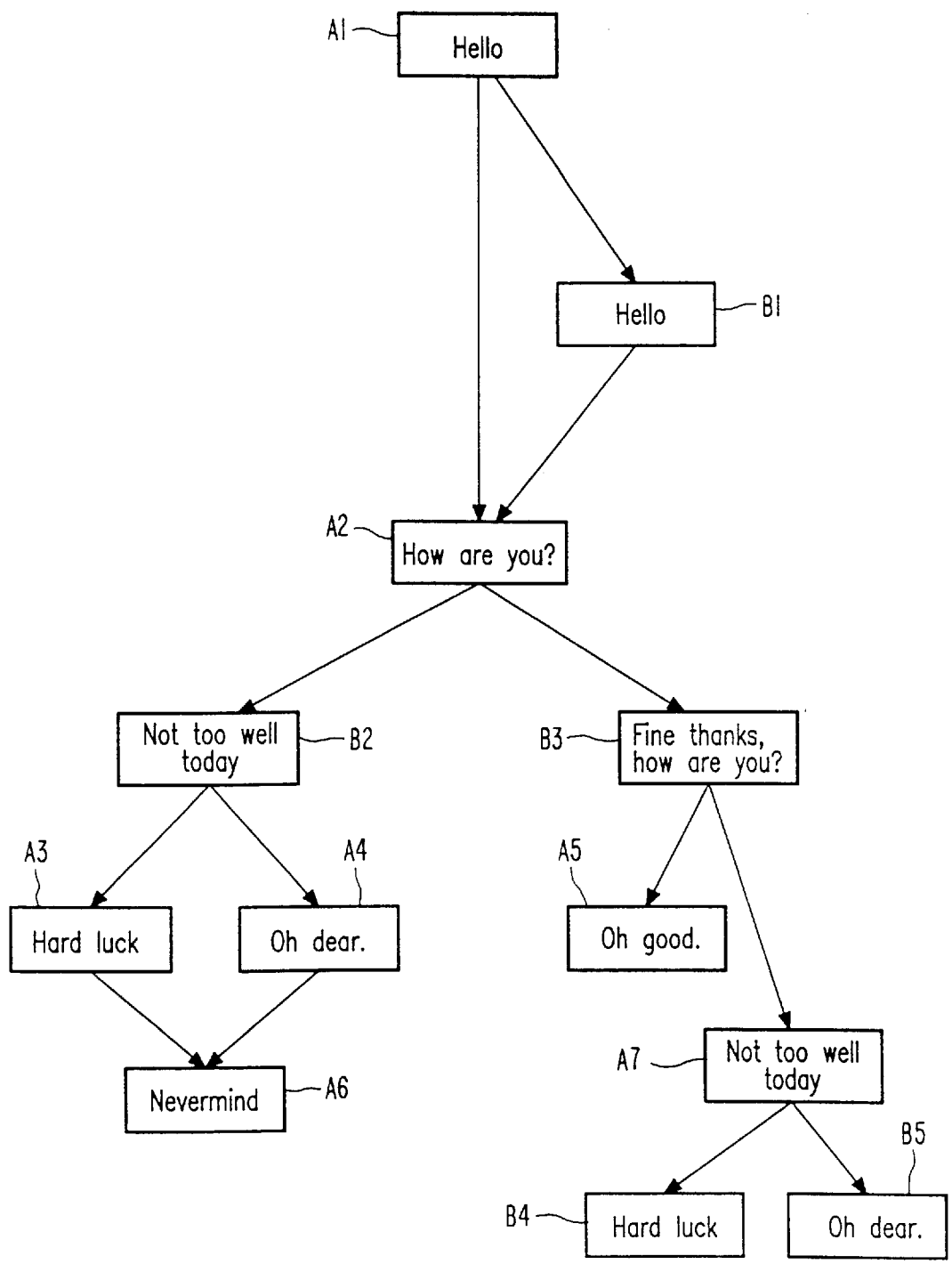
FIG. 1 illustrates a small section of a network of audio (speech) segments.

FIG. 1 illustrates a small section of the audio network with nodes A1–A7 containing speech segments of a first character and nodes B1–B5 containing speech segments of a second character. In the first node A1, the first character says "Hello": the choice of the next node (B1 or A2) depends on what conditions are satisfied at node A1. For example, the deciding condition may be associated with an attribute of the second character which equates to whether or not it feels talkative. If the attribute is currently set to "talkative", the branch path to node B1 will be selected and the second character will reply "Hello", otherwise the first character has to continue talking, asking "How are you?" at node A2.

The choice at node A2 depends on different conditions such that, although the second character is not feeling talkative, he will answer a direct question. The determining condition at node A2 may be the current setting of an attribute of the second character relating to his general well-being such that he will reply "Not too well today" (node B2) or "Fine thanks, how are you?" (node B3) depending on the setting. The setting of the corresponding attribute of the first character may decide its response to the question in node B3.

An effective attribute for enhancing the realism of the character interaction is the like/dislike "opinion" of the other character. Whilst some attributes may retain fixed values throughout the characters' interaction, others such as like/dislike are suitably dependent on the results of preceding interactions. These variable attributes may simply be "on" or "off" or may be more complex. With an initial attribute of 50 on a possible scale of 0–100, for example (i.e ambivalent to the second character), the branch selection at node A1 may entail an increase of 10 if the branch via node B1 is chosen and a reduction of 5 if the direct branch to node A2 is chosen with the attribute level change being the result of a function call at the destination node A2. The result is a like/dislike attribute setting of 60 or 45 depending on whether the second character "felt talkative" at the decision point of node A1. The like/dislike attribute setting may then be the deciding factor at node B2: if the setting is 50 or above, the first character has an ambivalent or friendly attitude to the second and will reply "Oh dear" (node A4) in response to hearing that the second character is unwell. With the attribute setting of 45, however, the first character has "taken a dislike" to the second and will instead respond "hard luck" at node A3.

The re-using of segments is shown by node A6 ("Never mind") which, in this example, follows both of nodes A3 and A4. In effect, in response to node B2 the first character may say "Hard luck, never mind" or "Oh dear, never mind". There is a trade-off to be made here with the saving in stored audio being offset by the additional call to the audio store necessary at node A3 or A4. Short phrases or even single words enable greatest re-usability but increase the complexity of the network and access times for the audio store may affect realism with short but noticeable pauses between successively called segments. Suitably, the audio segments may be split at punctuation points where a slight hesitation will sound more natural.

As can be seen from FIG. 1, the speaking of the same word/phrase by the different characters is handled with separate nodes (e.g A1 and B2, A4 and B5) since the audio segments in this instance are pre-recorded: the same also applies to different intonations of a given phrase by one character. Where the audio is generated from text by high quality speech synthesis apparatus able to handle different intonations/accents, phrases need only be stored once. This, however, leads to another trade off: whilst there is a reduction in the number of nodes, the branching structure becomes more complex and the number of conditions at each node increases with the need to determine which character is speaking and their intonation attribute settings before moving to assess the conditions determining branch selection to the next node.

The characters' "behaviour" will be dependent on the way in which they are modelled. In a basic implementation, they may simply be defined in terms of an accent which responds in a set way defined by the node conditions based on current attribute settings. Preferably, however, the individual characters are modelled as a complex collection of inter-related behaviours which may develop apparent personality traits as the interaction with the story web proceeds. Rule-based programming languages are preferred to enable linking of, for example, character attributes as modified by the passage through the nodes with other, internally held attributes. With such linking, the network-directed alteration of attribute levels may result in alteration of other attributes. For example, a character may have the network-directed attributes happy/sad and (other character) like/dislike which, in the basic implementation are independent. In the more complex character, an increase in the "happiness" attribute setting may result in an increase in the "like" attribute setting, as though the character was taking a kinder view of its fellows as its mood improved. In a development, the character may have an internal attribute (for example, fairness), not directly controlled by the function calls (which may themselves be programmed rules) of the audio web, the setting of which determines the extent to which the setting of the happy/sad attribute affects the setting of the like/dislike attribute. Such internal attributes may be set by the user or may be pre-set. Alternatively they may be affected by the characters' interactions and their results: for example, a consistently high like/dislike attribute setting may generate "trust" or "suspicion" in the character with a consequent raising or lowering of the fairness internal attribute setting.

A suitable real-time rule-based language for specifying such inter-related groups of attributes and their influence on each other is Real Time ABLE (RTA), described in Proceedings of the European Simulation Multiconference 1991 at pages 226–231. Further examples of the features of rule-based languages are given in "The Behaviour Language; User's Guide" by R A Brooks, AI Memo 1227, Massachusetts Institute of Technology, Artificial Intelligence Laboratory, April 1990.

Figure 2:
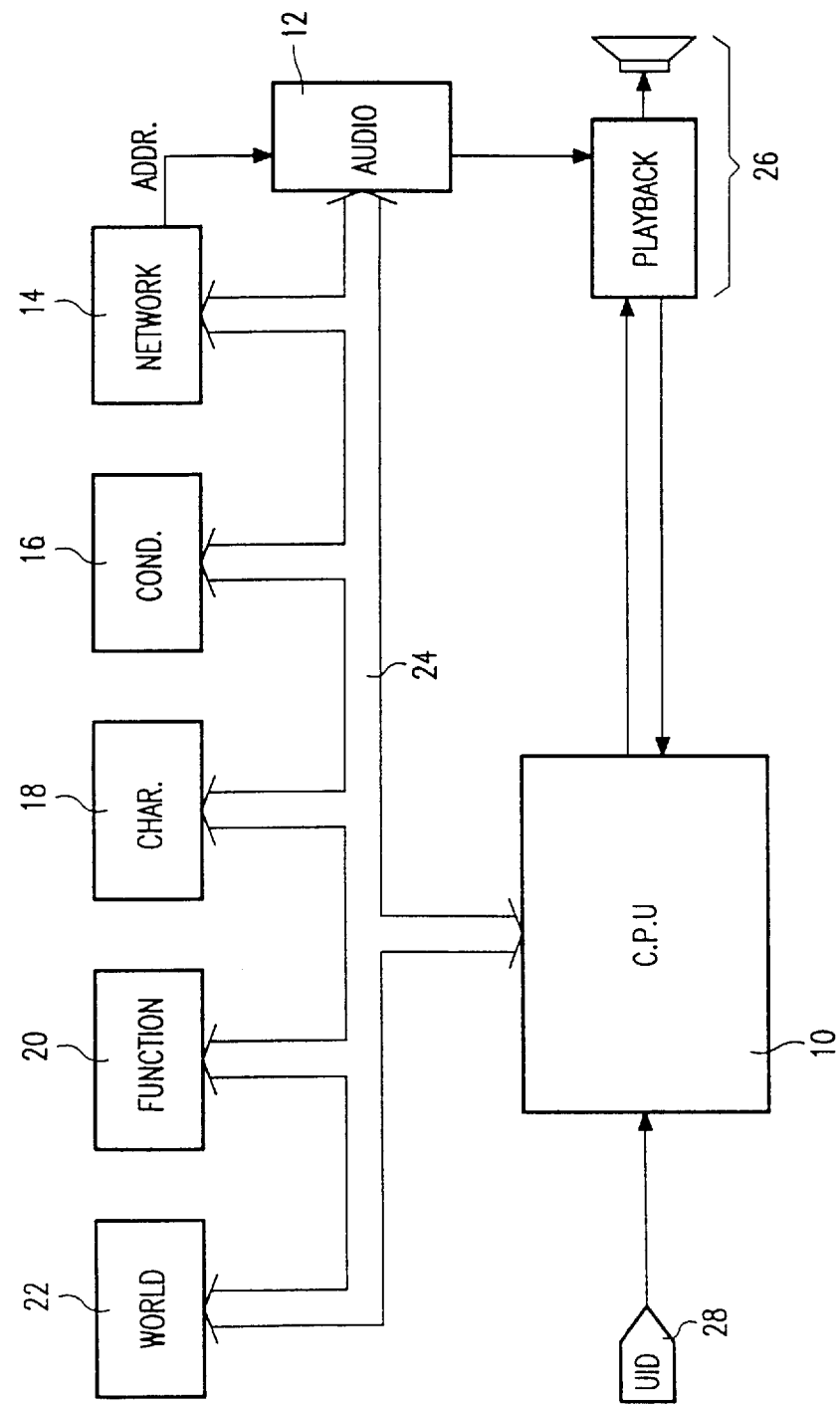
FIG. 2 is a block schematic diagram of apparatus embodying the invention.

FIG. 2 shows apparatus embodying the invention, comprising a processor 10 linked to a number of data stores 12,14,16,18,20,22 via data bus 24, together with an audio playback stage 26 and user input device 28. The first store, audio store 12, holds all of the speech and sound segments associated with the nodes of the network and outputs them, when called, to the audio playback stage 26 for direct play. The audio store may be built into the apparatus or may be provided on a removable storage device such as an optical disc with the processor 10 accessing the data via a suitable reader. Suitably the network description is also downloaded to the network store 14 (to be described) from the storage device together with indexing information such that each node is associated with the storage address of the associated audio segment. The processor 10 can then call for the audio segments from store by directly addressing them, thereby keeping access delays to a minimum.

The next store, network store 14, holds the script web, a file defining the network interlinking the nodes. A fragment of the script web file may be as shown in the example below:

| File: | Explanation: |
|---|---|
| #2026, 14 | Node number 2026. Call function number 14 if this node is selected. |
| >1150, 3,6,1 | Go to node 1150 if conditions 3, 6 and 1 are satisfied. |
| >2040, 3,2 | Go to node 2040 if conditions 3 and 2 are satisfied. |
| >2028 | Go to node 2028 if other branch conditions are unsatisfied. |
| #2028 | Node 2028. No attached functions. |
| >2100, 3,2,4 | Go to node 2100 if conditions 3, 2 and 4 are satisfied. |
| >1150, 3,2,1 | Go to node 1150 if conditions 3, 2 and 1 are satisfied. |
| >2040, 3,2 | Go to node 2040 if only conditions 3 and 2 are satisfied. |
| >1810 | Default to node 1810. |

When a node is selected, in CPU 10, the node number addresses the appropriate segment of stored audio (via address line ADDR) in audio store 12.

The next two stores 16,18 hold respectively the definitions of the condition tests to be applied and the current attribute settings for each character. The condition tests may be along the lines of "is attribute A greater than 50?" where attribute A is the like/dislike attribute described previously, the current value of which is held in character store 18.

The definition of the various functions which may be called at a node is held in function store 20. These functions may apply to the characters themselves, as various in one or more attribute settings as appropriate to the character learning or giving the information contained in the audio segment associated with the node at which the segment is called. The functions may also affect the virtual world within which the conversation takes place. The interaction between the characters may be improved if it moves between different "physical" environments, as defined in a model of the various virtual world scenarios held in world store 22, with the current environment in turn being the subject of one or more conditions. For example, a current environment of a prison cell would satisfy a condition leading to choice of the subsequent node audio segment "How do we get out of here?" rather than "I like it here".

The different scenarios would themselves be inter-linked, with both character access to, and movement between the different scenarios being determined by the particular point in, and past passage through, the audio network. On a direct level, the entry to a closed environment may require the character or characters to have passed through the node where a password was given. On an indirect level, movement into a different area of the network may trigger the movement to a new environment. The environment itself may be used to trigger audio effects via the CPU 10 and generated within the playback stage 26, for example echo when the conversation is taking place in a cave or dungeon scenario.

Those features which alter the attributes of the scenarios, including their selection from the virtual world, may be called by further nodes of the network without associated audio segments. These further nodes act as "stage directions" such as "open the door": stage direction nodes may, of course, have associated audio segments, such as sound effects, and these are incorporated as with the conversation segments.

The form of the user input device 28 will depend on the level of user interaction supported. At a basic level, the user input may be simply the initial selection of a cast of players or environments from a menu of those available. Increased levels of participation may involve initial or ongoing manipulation of character attributes (external or internal) with the user having a slider control on which he sets, for example, the like/dislike attribute of his "adopted" character in relation to his perception of another character of the narrative.

As will be recognised, the above-described techniques and apparatus might be extended to incorporate video although a detailed discussion is beyond the scope of the present invention. With the web navigation being handled in dependence on the audio links, additional considerations for added video include the problems of audio/video synchronisation, particularly to short (e.g single word) audio segments, and the possibility of conversation segments occurring in more than one virtual environment. Computer-generated characters and environments may alleviate some of these problems: others may require less direct visual representations such as a still image of the current environment with overlaid computer-generated images of the characters faces which change each time an appropriate attribute setting changes.

From reading the present disclosure, other modifications will be apparent to persons skilled in the art. Such modifications may involve other features which are already known in the field of interactive entertainment apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. An entertainment apparatus comprising:

network data and character data stores coupled with a data processor;

the network data store holding data defining a network of forward-linked nodes, with at least some nodes having forward links to two or more further nodes, and with the data processor being configured for the sequential selection of linked nodes of the network; and the character data store containing at least one stored attribute value and selection from said forward links to at least two further nodes being determined by said attribute value;

said attribute value being at least partly defined by at least one of earlier values of said attribute value and other attribute values;

an audio data store containing a plurality of data streams defining a respective audio signal segment for each node of the network, the audio data store being coupled with the network data processor and controlled to output an audio signal segment data stream on selection of a respective node.

2. Apparatus as claimed in claim 1, wherein said character data store contains a plurality of stored attribute values, the selection from said forward links to at least two further nodes being determined by the satisfaction of respective different combinations of attribute settings.

3. Apparatus as claimed in claim 2, wherein the selection of one of a plurality of links to respective further nodes is a default selection made when none of said respective different combinations of attribute settings is satisfied.

4. Apparatus as claimed in claim 1, further comprising a function call store holding a plurality of commands each specifying a respective data processor function, each function call being associated with at least one node of the network and being called and implemented by the data processor on selection of the or each associated node.

5. Apparatus as claimed in claim 4, wherein one or more further nodes are defined in the network, the or each such further node having an associated function call, but no respective audio signal segment.

6. Apparatus as claimed in claim 4, wherein the data processor is controlled to modify at least one stored attribute value from said character data store in response to at least one function call.

7. Apparatus claimed in claim 1, further comprising user-operable input means coupled to said data processor, with user input affecting the said selection from links to at least two further nodes from one or more nodes of the network.

8. Apparatus as claimed in claim 7, wherein the data processor alters the setting of at least one stored attribute value in dependence on said user input.

9. Apparatus as claimed in claim 1, further comprising audio signal reproduction apparatus coupled to said audio data store, receiving the data streams output therefrom and reproducing the respective audio signal segments defined.

10. Apparatus as claimed in claim 1, wherein at least said audio data store comprises a removable storage device, the apparatus further comprising means for accessing the audio signal segment data streams therefrom.

11. An apparatus as in claim 10, holding said audio signal segment data streams together with the data of said network data store which data includes indexing information identifying the respective storage locations of each audio signal segment data stream.

12. An apparatus as claimed in claim 11, wherein said device is an optical disc and said indexing information identifies track and sector addresses for the audio signal segment data streams.

13. A method for providing entertainment comprising the steps of:

providing linked nodes, each of said nodes having at least audio data, at least some of said nodes being linked to two or more further linked nodes;

having at least one attribute value being used to determine a sequence of said linked nodes;

said at least one attribute value being based at least partly based upon at least one of a previous value of said attribute value and other attribute values; and accessing said linked nodes in said sequence.

* * * * *